United States Patent
Fujii et al.

(10) Patent No.: US 8,559,201 B2
(45) Date of Patent: Oct. 15, 2013

(54) GRID-CONNECTED INVERTER

(75) Inventors: Kansuke Fujii, Machida (JP); Toshiya Yamada, Kobe (JP); Masaki Katoh, Kobe (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 416 days.

(21) Appl. No.: 13/084,528

(22) Filed: Apr. 11, 2011

(65) Prior Publication Data

US 2011/0249475 A1    Oct. 13, 2011

(30) Foreign Application Priority Data

Apr. 12, 2010    (JP) .................................. 2010-091120

(51) Int. Cl.
*H02H 7/122*    (2006.01)

(52) U.S. Cl.
USPC ................................. 363/55; 323/266; 363/79

(58) Field of Classification Search
USPC ...................... 323/266; 363/50, 55, 74, 79, 95
See application file for complete search history.

(56) References Cited

U.S. PATENT DOCUMENTS

| | | | |
|---|---|---|---|
| 6,809,942 B2 * | 10/2004 | Madenokouji et al. | 363/98 |
| 2011/0249475 A1 * | 10/2011 | Fujii et al. | 363/50 |

FOREIGN PATENT DOCUMENTS

| | | |
|---|---|---|
| JP | 07-327320 A | 12/1995 |
| JP | 2004-187362 A | 7/2004 |
| JP | 2008-035655 A | 2/2008 |

* cited by examiner

*Primary Examiner* — Jeffrey Sterrett
(74) *Attorney, Agent, or Firm* — Rabin & Berdo, P.C.

(57) ABSTRACT

A grid-connected inverter includes first and second power conversion circuits, a contactor and a control circuit. The first conversion circuit converts a first DC voltage to a second DC voltage. The second conversion circuit converts the second DC voltage to an AC voltage. The contactor connects an output side of the second conversion circuit to a power system. The control circuit includes a decision circuit and controls start and stop operations of the conversion circuits, and opening and closing of the contactor. The decision circuit decides whether a condition of the contactor is abnormal by detecting, after the control circuit controls the contactor to be open, whether or not a value of the second DC voltage is less than a threshold value, and if the value of the second DC voltage is detected to be not less than the threshold value, decides that the condition of the contactor is abnormal.

12 Claims, 7 Drawing Sheets

GRID-CONNECTED INVERTER

CROSS-REFERENCE TO RELATED APPLICATION

This application claims priority under 35 U.S.C.§119 from Japanese Patent Application 2010-091120, filed Apr. 12, 2010, the entirety of which is incorporated herein by reference.

BACKGROUND OF THE INVENTION

1. Field of the Invention

The present invention relates to a grid-connected inverter that converts DC electric power, generated by solar cells or fuel cells, to AC electric power and is interconnected to a commercial power system.

2. Related Art

Previously, a grid-connected inverter has been provided that converts DC electric power, generated by a solar cell or a fuel cell, to AC electric power and is interconnected to a commercial power system for supplying electric power to loads.

In the following, with reference to FIG. 6 and FIG. 7, a grid connection system including a related interconnection unit will be explained. FIG. 6 is a block diagram showing a solar cell power generation system as a first example of a grid connection system including a related interconnection unit disclosed in JP-A-2008-35655 in which a capacitor current is detected. The power generation system is formed of a solar cell 1 whose generated power varies depending on an amount of solar radiation and a grid-connected inverter 2 converting DC electric power, generated by the solar cell 1, to AC electric power, and is interconnected to a commercial power system 3. The grid connection system supplies AC electric power to a load (not shown) connected between the grid-connected inverter 2 and the commercial power system 3 by switching the operation of the grid connection system to either an interconnection operation of the grid-connected inverter 2 and the commercial power system 3 or an individual operation of only the grid-connected inverter 2.

The grid-connected inverter 2 is formed of a boost chopper 4 stepping up the DC electric power outputted by the solar cell 1, an inverter circuit 5 converting the output voltage of the boost chopper 4 to an AC voltage, a filter circuit 6 smoothing the output voltage of the inverter circuit 5 to make the output voltage have a sinusoidal waveform, a contactor 7 connected between the filter circuit 6 and the commercial power system 3 and a control circuit 8 giving turning-on and -off signals to each of switching devices 51 to 54. In the boost chopper 4, the output voltage of the solar cell 1 varying within the range on the order of 100V to 300V is stepped up to the order of 350V. With the stepped up DC voltage taken as an input voltage, PWM control is carried out in the inverter circuit 5 to convert the DC voltage to an AC voltage. The filter circuit 6 eliminates ripple components with a PWM carrier frequency included in the output of the inverter circuit 5, by which the inputted AC voltage is converted to a sinusoidal AC voltage of the order of 200V (for example, 202V±20V) to be outputted.

The control circuit 8 is to detect an input of an operating instruction and is to operate the grid-connected inverter 2 when the value of the generated voltage of the solar cell 1 is equal to or more than a specified value. When no operating instruction is inputted or when the value of the generated voltage of the solar cell 1, detected by a voltage detector (not shown), is less than the specified value, the control circuit 8 is to stop the operation of the grid-connected inverter 2.

The boost chopper 4 is formed of an inductor 41, a switching device 42 such as an IGBT, a diode 43 and a capacitor 44. Specifically, the inductor 41 is connected to the positive electrode side of the solar cell 1, to the corrector of the switching device 42, and to the anode side of the diode 43. Moreover, the emitter side of the switching device 42 is connected to the negative electrode side of the solar cell 1, and the cathode side of the diode 43 is connected to the emitter side of the switching device 42 through the capacitor 44. The output voltage of the boost chopper 4 is detected by the voltage detector (not shown), the detection signal of which is inputted to the control circuit 8. In the control circuit 8, processing of the inputted detection signal is carried out to determine the duty ratio of a pulse signal to be outputted. With the pulse signal having the determined duty ratio given to the gate of the switching device 42, the output voltage of the boost chopper 4 is controlled to a specified voltage.

The inverter circuit 5 is formed with the switching devices 51 to 54 such as IGBTs arranged in a full bridge connection. Each of the switching devices 51 to 54 is subjected to switching according to a PWM control carried out by the control circuit 8 to convert the DC electric power, outputted from the boost chopper 4, to AC electric power. The filter circuit 6 is formed of inductors 61 and 62 and a capacitor 63. Specifically, one end of the inductor 61 is connected to the connection point of the series connected switching devices 52 and 54 in the inverter circuit 5. One end of the inductor 62 is connected to the connection point of the series connected switching devices 51 and 53 in the inverter circuit 5. Moreover, the capacitor 63 is connected between the other ends of the inductors 61 and 62. With such a configuration, ripple components with a PWM carrier frequency are eliminated to make the output voltage of the inverter circuit 5 smoothed to have a sinusoidal waveform and outputted to the commercial power system 3.

The contactor 7 is connected between the filter circuit 6 and the commercial power system 3 to perform interconnection or disconnect between the grid-connected inverter 2 and the commercial power system 3 by a control signal outputted from the control circuit 8.

A current detector 9 detects an output current smoothed through the filter circuit 6 while the inverter circuit 5 is in operation. The detection signal of the detected output current is transmitted to the control circuit 8 and used for carrying out control so that the output current becomes in phase with the voltage of the commercial power system 3 detected by a voltage detector 10. Moreover, the current detector 9 is also used for detecting the flow of an overcurrent due to a failure of any one of the switching devices 51 to 54 in the inverter circuit 5. When an overcurrent is detected, the control circuit 8 decides that the grid-connected inverter 2 is in an abnormal condition to carry out actions such as a stop of the operation of the inverter circuit 5, a disconnect of the contactor 7, and a stop of the operation of the boost chopper 4 to stop the operation of the grid-connected inverter 2.

The voltage detector 10 detects the voltage of the commercial power system 3. The detection signal of the detected voltage is transmitted to the control circuit 8, which makes a decision as to whether or not each of the voltage and frequency of the commercial power system 3 is within a correct range required by the operational specification. When the detected voltage is out of the correct range, the control circuit 8 carries out operations such as stopping of the operation of the inverter circuit 5, disconnect of the contactor 7 and stopping of the operation of the boost chopper 4 to stop the operation of the grid-connected inverter 2.

If a disconnect signal is transmitted to the contactor 7 with the inverter circuit 5 stopped, the control circuit 8 decides from the voltage detected by the voltage detector 10 and the current detected by the current detector 9, that a reactive current flows in the filter circuit 6, and also decides that the contactor 7 is in an abnormal condition. If an interconnection signal is transmitted to the contactor 7 with the inverter circuit 5 stopped, the control circuit 8 decides that no reactive current flows in the filter circuit 6, and also makes a decision that the contactor 7 is in an abnormal condition.

FIG. 7 is a block diagram showing a solar cell power generation system as a second example of a grid connection system including the related grid-connected inverter disclosed in JP-A-2004-187362 in which an inverter current is detected.

A control circuit 8 makes the operations of a DC voltage conversion circuit 4 and an inverter circuit 5 stopped. Along with this, with a contactor 7 being opened immediately before starting an interconnection operation, the control circuit 8 takes in the results of detection by a voltage detector 13 to compare the value of the terminal voltage detected by the voltage detector 13 with a specified threshold value. When the value of the terminal voltage detected by the voltage detector 13 is higher than the specified threshold value despite the absence of an input signal for closing the contactor 7, the control circuit 8 decides that an abnormality such as contact adhesion occurs in the contactor 7. The control circuit 8, deciding that an abnormality occurs in the contactor 7, brings the DC voltage conversion circuit 4 and the inverter circuit 5 to a stopped state to discontinue the interconnection operation.

However, in the related grid-connected inverter 2 according to the above explained JP-A-2008-35655, with reference to FIG. 6, an overcurrent (a current equal to or more than 45 A, for example) is produced due to a failure such as a failure of any one of the switching devices 51 to 54. This requires the current detector 9 to be selected as one capable of detecting a current of a value exceeding the value of the overcurrent (50 A to 60 A, for example). Moreover, when the inverter circuit 5 is stopped and the contactor 7 is closed, the value of the reactive current flowing in the filter circuit 6 is on the order of 1.13 A, for example, which is a very small value since it is on the order of 2% of the value of a current that can be detected by the current detector 9. Thus, when the control circuit 8 is making a decision of the presence or absence of an abnormality in the contactor 7 on the basis of a minute current flowing in the capacitor 63 in the filter circuit 6, there was difficulty in precisely setting a threshold value for this purpose. This might cause the control circuit 8 to make an erroneous decision that the contactor 7 was abnormal.

Moreover, in the related grid-connected inverter 2 according to JP-A-2004-187362, with reference to FIG. 7, the voltage detector 13 was necessary for detecting the output voltage of the filter circuit 6 for making a decision of the presence or absence of an abnormality in the contactor 7. This caused a problem of required increases in cost and dimensions of the grid-connected inverter 2.

The invention was made to solve problems that arose in the related grid-connected inverters by actualizing a grid-connected inverter which can be made small in size at low cost, with a capability to reliably detect abnormalities in a contactor.

SUMMARY OF THE INVENTION

For achieving the above object, a first aspect according to the invention is a grid-connected inverter that includes: a first electric power conversion circuit that converts a first DC voltage to a second DC voltage to output the second DC voltage, and a second electric power conversion circuit that converts the second DC voltage to an AC voltage to output the AC voltage. A contactor connects the output side of the second electric power conversion circuit and a commercial power system. A control circuit controls the first and second electric power conversion circuits and opening and closing of the contactor. The control circuit has a switch abnormality decision means that decides that the contactor is in an abnormal condition upon detecting that the value of the second DC voltage is equal to or more than a specified threshold value when the control circuit controls the contactor to be in an opened state.

A second problem aspect is the grid-connected inverter that includes a clamping means. The clamping means clamps the second DC voltage to the first DC voltage when the control circuit makes the first and second electric power conversion circuits stopped. The threshold value is a value not less than the value of the first DC voltage and not more than the value of a voltage obtained by rectifying the voltage of the commercial power system.

A third aspect is the grid-connected inverter in which the threshold value is a value based on at least one of the value of the first DC voltage and the value of the voltage of the commercial power system.

A fourth aspect is the grid-connected inverter that further includes: a capacitor connected to the output side of the first electric power conversion circuit and a capacitor discharging means that discharges electric charges stored in the capacitor when the first and second electric power conversion circuits are stopped. The threshold value is a value of a voltage not less than 0V and not more than a voltage obtained by rectifying the voltage of the commercial power system.

A fifth aspect is the grid-connected inverter in which the threshold value is a value based on the value of the voltage of the commercial power system.

A sixth aspect is the grid-connected inverter in which the control circuit makes the first and second electric power conversion circuits stop when the switch abnormality decision means makes a decision that there is an abnormality in the contactor.

A seventh aspect is the grid-connected inverter that includes a circuit breaker provided between the contactor and the commercial power system. The control circuit makes the circuit breaker open when the switch abnormality decision means makes a decision that there is an abnormality in the contactor.

An eighth aspect is the grid-connected inverter in which the control circuit opens the contactor to disconnect the grid-connected inverter from the commercial power system when the switch abnormality decision means decides that there is an abnormality in the contactor.

The grid-connected inverter according to the invention can make a decision of the presence or absence of an abnormality of a contactor by using only a circuit voltage used for operation control. Thus, there is no necessity of additionally providing a specialized unit for detecting the presence or absence of an abnormality of the contactor. Moreover, the presence or absence of an abnormality of the contactor is decided on the basis of a voltage across a charged capacitor rather than a minute current flowing in a filter circuit to avoid miss-detection caused of a noise. Therefore, a grid-connected inverter with high reliability can be provided without causing upsizing and a cost increase of the grid-connected inverter.

In addition, an abnormality of a contactor can be found before starting the operation of the grid-connected inverter to enable protection of secondary failure and, along with this, enable safer disconnect from the system.

DETAILED DESCRIPTION OF THE INVENTION

Figure 1:
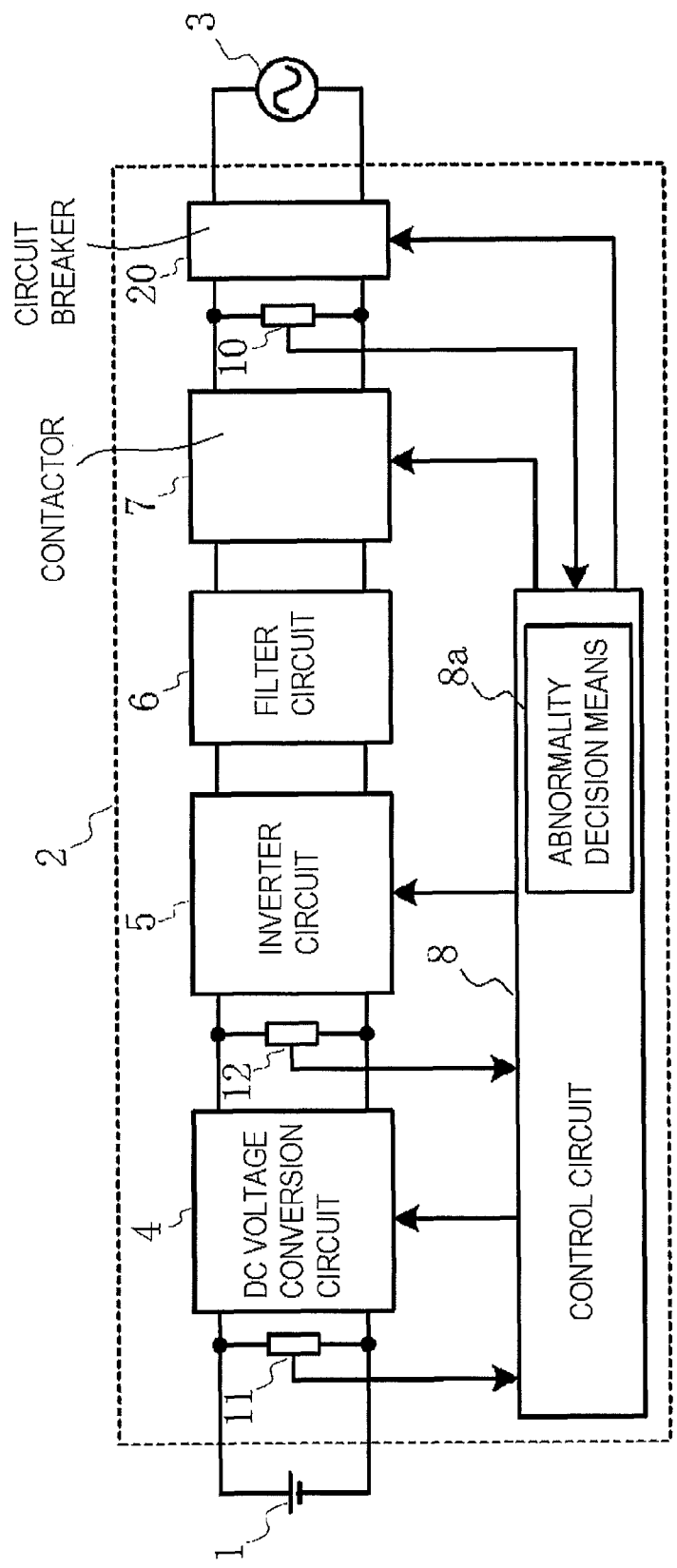
FIG. 1 is a block diagram showing an outline of a solar cell power generation system as an example of a grid connection system according to the invention.

In the following, embodiments of the invention will be explained in detail on the basis of FIG. 1 to FIG. 5. Here, constituents common to those in the related grid-connected inverter are denoted by the same reference numerals and signs with the explanations thereof will be omitted.

Figure 6:
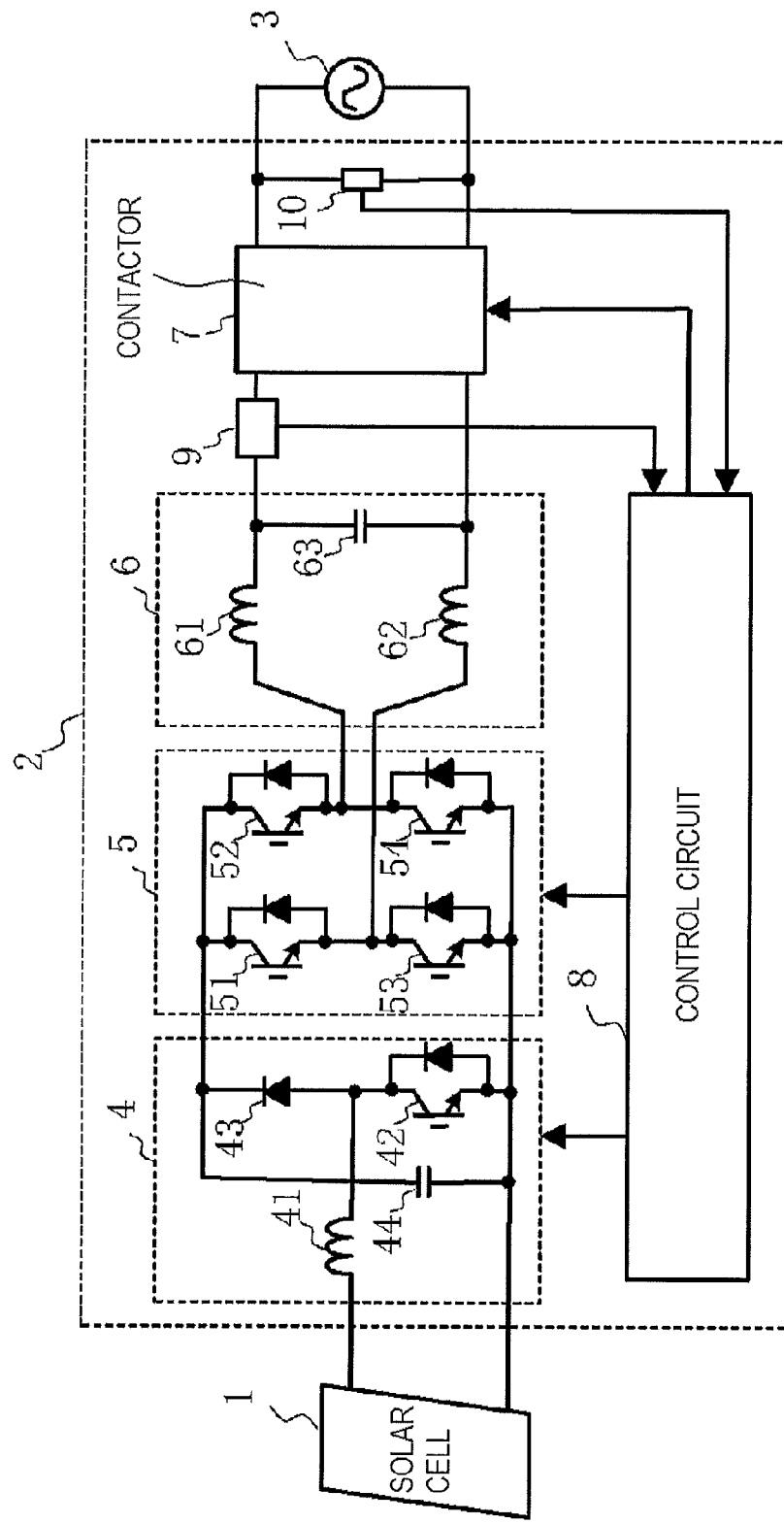
FIG. 6 is a block diagram showing a solar cell power generation system as a first example of a grid connection system including a related grid-connected inverter in which a capacitor current is detected.
Figure 7:
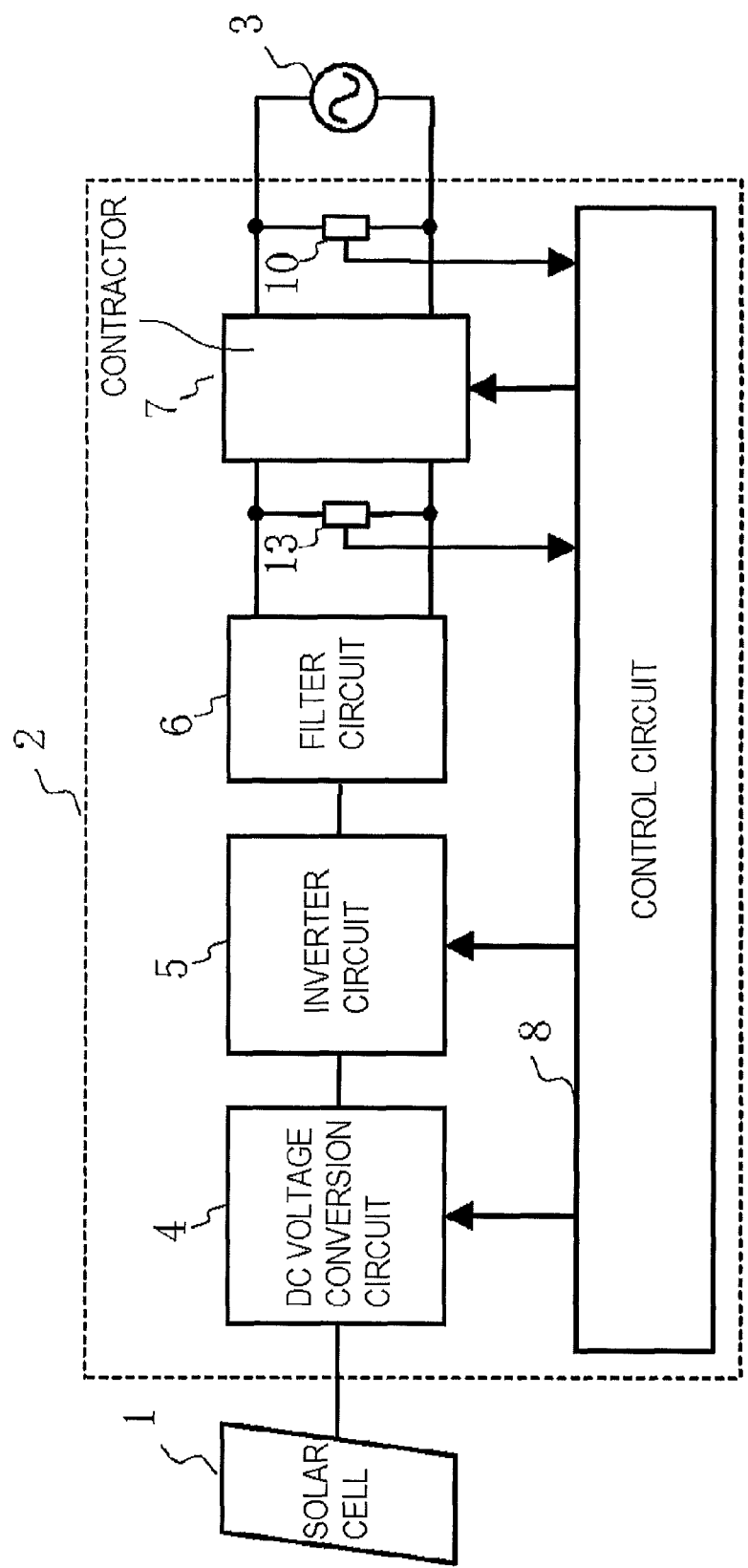
FIG. 7 is a block diagram showing a solar cell power generation system as a second example of a grid connection system including a related grid-connected inverter in which an inverter current is detected.

FIG. 1 is a block diagram showing an outline of a solar cell power generation system as an example of a grid connection system according to the invention. In FIG. 1, a voltage detector 11, a voltage detector 12 and a circuit breaker 20 are clearly shown which are not shown in FIG. 6 and FIG. 7 showing related units.

The voltage detector 11 is provided between a solar cell 1 and a DC voltage conversion circuit (first electric power conversion circuit) 4 for detecting the generated voltage of the solar cell 1. The voltage detector 12 is provided between the DC voltage conversion circuit 4 and an inverter circuit (second electric power conversion circuit) 5 for detecting the output voltage of the DC voltage conversion circuit 4. The circuit breaker 20 is a protecting device provided between a contactor 7 and a commercial power system 3 for forcing a grid-connected inverter 2 to be disconnected from a commercial power system 3 when an accident, such as an overcurrent, occurs in the grid-connected inverter 2 or the commercial power system 3. Therefore, when the grid-connected inverter 2 is normally operated, the circuit breaker 20 is always closed.

In FIG. 1, a voltage generated by the solar cell 1 is detected by the voltage detector 11 to be inputted to a control circuit 8. The control circuit 8, when an operation instruction is inputted and a value of a generated voltage of the solar cell 1 is equal to or more than a specified value, makes the DC voltage conversion circuit 4 start operation. The DC voltage conversion circuit 4 converts a first DC voltage generated by the solar cell 1 to a second DC voltage to output the converted DC voltage to the inverter circuit 5 in the next stage.

The output voltage of the DC voltage conversion circuit 4 is detected by the voltage detector 12 to be inputted to the control circuit 8. The control circuit 8, when the value of the output voltage of the DC voltage conversion circuit 4 reaches a specified value, makes the inverter circuit 5 start an operation. The inverter circuit 5 converts the DC voltage outputted from the DC voltage conversion circuit 4 to an AC voltage to output the converted DC voltage to a filter circuit 6 in the next stage. The filter circuit 6 carries out smoothing of the AC voltage outputted from the inverter circuit 5 to an AC voltage with a sinusoidal waveform.

The control circuit 8, when the output voltage of the inverter circuit 5 becomes equal to the voltage of the commercial power system 3 detected by a voltage detector 10, transmits a closing signal to the contactor 7. With the contactor 7 made closed, the control circuit 8 operates the grid-connected inverter 2 in interconnection with the commercial power system 3. Moreover, when no operation instruction is inputted or the value of the generated voltage of the solar cell 1 is lower than a specified value, the control circuit 8 stops the operation of the grid-connected inverter 2 to transmit a disconnect signal to the contactor 7.

The control circuit 8 is provided with a switch abnormality decision means 8a which carries out decision of the presence or absence of abnormality in the contactor 7 when the control circuit 8 stops the operation of the grid-connected inverter 2 and transmits a disconnect signal to the contactor 7. The switch abnormality decision means 8a, when the value of a voltage detected by the voltage detector 12 is equal to or more than the specified threshold value, makes a decision that the contactor 7 is abnormal.

When the switch abnormality decision means 8a makes a decision that the contactor 7 is abnormal, since then, the control circuit 8 no more starts operations of the DC voltage conversion circuit 4 and the inverter circuit 5 even though an operating instruction is inputted. Moreover, the control circuit 8 transmits a disconnect signal to the circuit breaker 20 to disconnect the grid-connected inverter 2 from the commercial power system 3.

In this way, with the grid-connected inverter 2 according to the embodiment of the invention, the switch abnormality decision means 8a makes a decision of the presence or absence of an abnormality of the contactor 7 by using the value of a voltage detected by the voltage detector 12, provided for detecting the output voltage of the DC voltage conversion circuit 4, to necessitate no specialized detector such as the voltage detector 13 provided in the related grid-connected inverter as shown in FIG. 7. Moreover, when the contactor 7 becomes abnormal to cause no disconnect of the grid-connected inverter 2 from the commercial power system 3, a voltage, to which the voltage of the commercial power system 3 is rectified by the inverter circuit 5, appears in the output of the DC voltage conversion circuit 4. On the basis of thus appeared voltage, the switch abnormality decision means 8a can make a decision that the contactor 7 is abnormal to make it possible to prevent an erroneous decision caused by noises.

Figure 2:
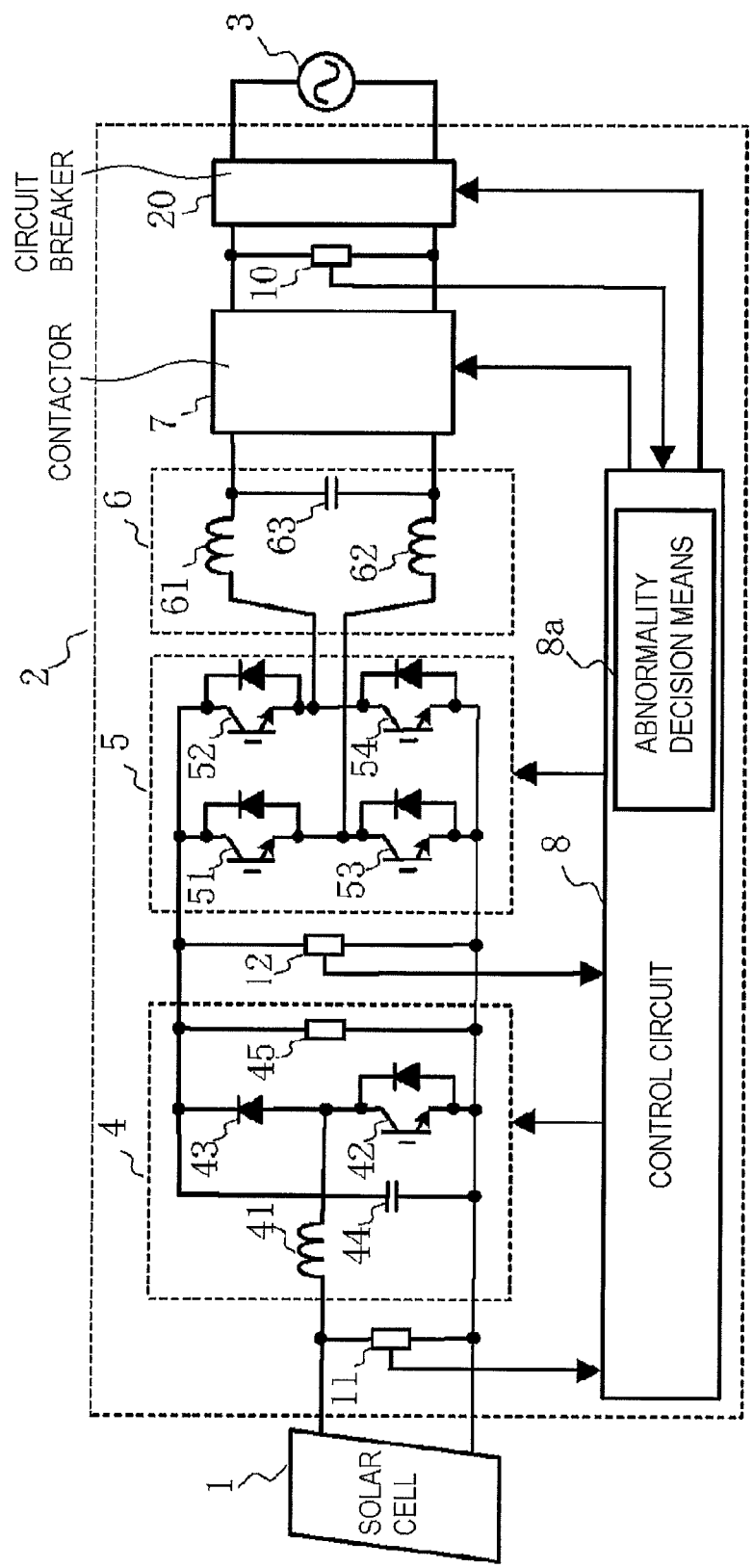
FIG. 2 is a block diagram showing a first example of a solar cell power generation system as an example of a grid connection system according to the invention.

FIG. 2 is a block diagram showing a first example of a solar cell power generation system as an example of a grid connection system according to the invention. In FIG. 2, the DC voltage conversion circuit 4 in FIG. 1 is formed as a boost chopper 4. The boost chopper 4 is formed of an inductor 41, a switching device 42 such as IGBT, a diode 43 and a capacitor 44. Specifically, the inductor 41 is connected to the positive electrode side of the solar cell 1, to the corrector of the switching device 42, and to the anode side of the diode 43 connected. Moreover, the emitter side of the switching device 42 is connected to the negative electrode side of the solar cell 1, and the cathode side of the diode 43 is connected to the emitter side of the switching device 42 through the capacitor 44. The capacitor 44 is provided at the output stage of the boost chopper 4. In parallel to the capacitor 44, a resistor 45 (capacitor discharging means) is connected. The resistor 45 is for discharging the electric charges stored in the capacitor 44 at maintenance work of the grid-connected inverter 2 and ensuring safety of workers.

In the solar cell power generation system, the control circuit 8 makes a switching device 42 turned-on and -off with a duty ratio determined by carrying out arithmetic operations to control the value of the voltage across the capacitor 44 at a specified value. Specifically, the boost chopper 4 steps up the voltage generated by the solar cell 1, which voltage varies within a range on the order of 100V to 300V, up to the order of 700V. The control circuit 8 detects the stepped up DC voltage by the voltage detector 12 and carried out arithmetic operations on the value of the detected voltage to determine controlled variables of PWM, with which the inverter circuit 5 is controlled to convert the stepped up DC voltage to an AC voltage.

The filter circuit 6 is formed of inductors 61 and 62 and a capacitor 63. Specifically, one end of the inductor 61 is connected to the connection point of the series connected switching devices 52 and 54 in the inverter circuit 5. One end of the inductor 62 is connected to the connection point of the series connected switching devices 51 and 53 in the inverter circuit 5. Moreover, the capacitor 63 is connected between the other ends of the inductors 61 and 62. The filter circuit 6 eliminates ripple components with a PWM carrier frequency included in the output of the inverter circuit 5, by which the inputted AC voltage is converted to a sinusoidal AC voltage of the order of 400V (for example, 380V to 415V) to be outputted.

Next, an operation, with which the switch abnormality decision means 8a in the control circuit 8 makes a decision of the presence or absence of an abnormality of the contactor 7, will be explained. The control circuit 8, when stopping the operation of the grid-connected inverter 2, turns-off a switching device 42 in the boost chopper 4 and switching devices 51 to 54 in the inverter circuit 5 and transmits a disconnect signal to the contactor 7 to open the contactor 7. When the contactor 7 is opened, the grid-connected inverter 2 is subjected to disconnect from the commercial power system 3. As a result, the capacitor 44 is discharged through the resistor 45. Thus, the voltage across the capacitor 44 reduces to a voltage to which the voltage generated by the solar cell is clamped by a diode (clamping means) 43.

However, when contact adhesion occurs in the contactor 7, the grid-connected inverter 2 is not subjected to disconnect from the commercial power system 3, though the control circuit 8 sends a disconnect signal to the contactor 7. In this case, a charging current flows from the commercial power system 3 to the capacitor 44 through diodes connected in inverse parallel to their respective switching devices 51 to 54 forming the inverter circuit 5. This causes the capacitors 44 to remain charged by the voltage to which the voltage of the commercial power system 3 is subjected to full-wave rectification.

Therefore, the switch abnormality decision means 8a in the control circuit 8, when the value of the voltage detected by the voltage detector 12 is equal to or more than the threshold value despite sending of a disconnect signal to the contactor 7, can make a decision that the contactor 7 is in an abnormal condition.

The threshold value for making the decision of the presence or absence of an abnormality of the contactor 7 is to be, for example, a value not less than the maximum value of the voltage generated by the solar cell 1 and not more than the value of a voltage obtained by carrying out a full-wave rectification of the minimum voltage of the commercial power system 3 (an intermediate value of the values of both voltages, for example). The averaged voltage after full-wave rectification when the commercial power system 3 is a single-phase system is given as $$\text{Averaged voltage after full-wave rectification} = (\text{Root-mean-square value of a system voltage}) \times \sqrt{2} \times 2/\pi$$

and, when the commercial power system 3 is a three-phase system, is given as $$\text{Averaged voltage after full-wave rectification} = (\text{Root-mean-square value of a system voltage}) \times \sqrt{2} \times 3/\pi.$$

In the example, the threshold value is to be 321V, an intermediate value of 300V as the maximum output voltage value of the solar cell 1 and 342V as the value of the voltage after full-wave rectification of the minimum voltage of 380V of the commercial power system 3. When contact adhesion occurs in the contactor 7, the voltage detector 12 detects an averaged voltage (342V to 373V) after full-wave rectification of the AC voltage of the commercial power system 3. Since the voltage detector 12 thus detects a voltage with the value higher than the threshold value, the switch abnormality decision means 8a in the control circuit 8 can make a decision that the contactor 7 is abnormal.

In the above example, the threshold value is set on the basis of the values determined according to the specifications of the generated voltage of the solar cell 1 and the voltage of the commercial power system 3, respectively. The threshold value, however, can be also set on the basis of the values of the respective voltages detected by the voltage detector 11 detecting the voltage generated by the solar cell 1 and by the voltage detector 10 detecting the system voltage of the commercial power system 3. Moreover, with the lower limit of the threshold value taken as the specified value of the voltage generated by the solar cell 1 and the upper limit taken as the value of the system voltage of the commercial power system 3 detected by the voltage detector 10, the threshold value can be also determined on the basis of the upper and lower limit values. Furthermore, with the lower limit of the threshold value taken as the value of the voltage detected by the voltage detector 11 detecting the generated voltage of the solar cell 1 and the upper limit taken as the value of a voltage detected by the voltage detector 10 detecting the system voltage of the commercial power system 3, the threshold values can be determined on the basis of the upper and lower limit values.

Figure 3:
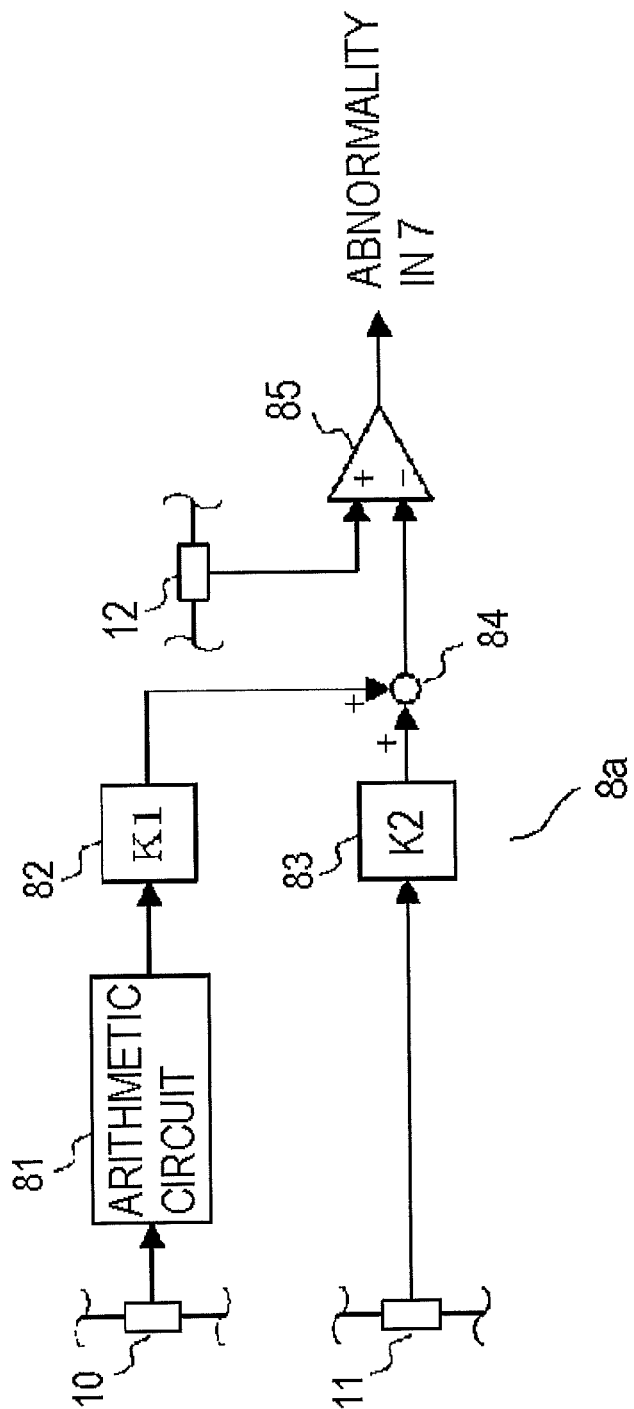
FIG. 3 is a block diagram showing an example of a switch abnormality decision means making a decision of the presence or absence of the abnormality of the contactor.

FIG. 3 is a block diagram showing an example of the switch abnormality decision means 8a setting a threshold value of a voltage on the basis of the system voltage of the commercial power system 3 and the generated voltage of the solar cell 1 to make a decision of the presence or absence of the abnormality of the contactor 7.

The switch abnormality decision means 8a includes an arithmetic circuit for averaged value operation 81, a multiplier 82, a multiplier 83, an adder 84 and a comparator 85. The arithmetic circuit for averaged value operation 81 carries out an absolute value operation of the AC voltage of the commercial power system 3 detected by the voltage detector 10 before carrying out an arithmetic operation for the averaged value to output the result of the arithmetic operation. The multiplier 82 carries out multiplication of the value of the voltage outputted from the arithmetic circuit for averaged value operation 81 by a specified multiplication coefficient K1 to output the result of the multiplication. The multiplier 83 carries out multiplication of the value of the voltage generated by the solar cell 1, which voltage is detected by the voltage detector 11, by a specified multiplication coefficient K2 to output the result of the multiplication. The adder 84 carries out addition of the output of the multiplier 82 and the output of the multiplier 83 to output the result of the multiplication as a threshold value for making a decision of the presence or absence of the abnormality of the contactor 7. The comparator 85 compares the value of the output voltage of the boost chopper 4 detected by the voltage detector 12 with the threshold value outputted from the adder 84 and, when the value of the output voltage of the boost chopper 4 is equal to or more than the above described threshold value, outputs a signal indicating an abnormality of the contactor 7.

Here, with the coefficient of multiplication K1 of the multiplier 82 and the coefficient of multiplication K2 of the multiplier 83 adequately selected, within the ranges of the values of voltages respectively detected by the voltage detector 10 and the voltage detector 11, a threshold value can be set for making a decision of the presence or absence of an abnormality of the contactor 7. For example, with the coefficients of multiplication of the multiplier 82 and the multiplier 83 set as K1=0.5 and K2=0.5, respectively, an intermediate value of the averaged value of the AC voltage detected by the voltage detector 10 and the value of the voltage detected by the voltage detector 11 can be set as the threshold value. When the value of the voltage detected by the voltage detector 12 is equal to or more than the threshold value, the output of the comparator 85 becomes "H" to enable the decision that the contactor 7 is abnormal.

Figure 4:
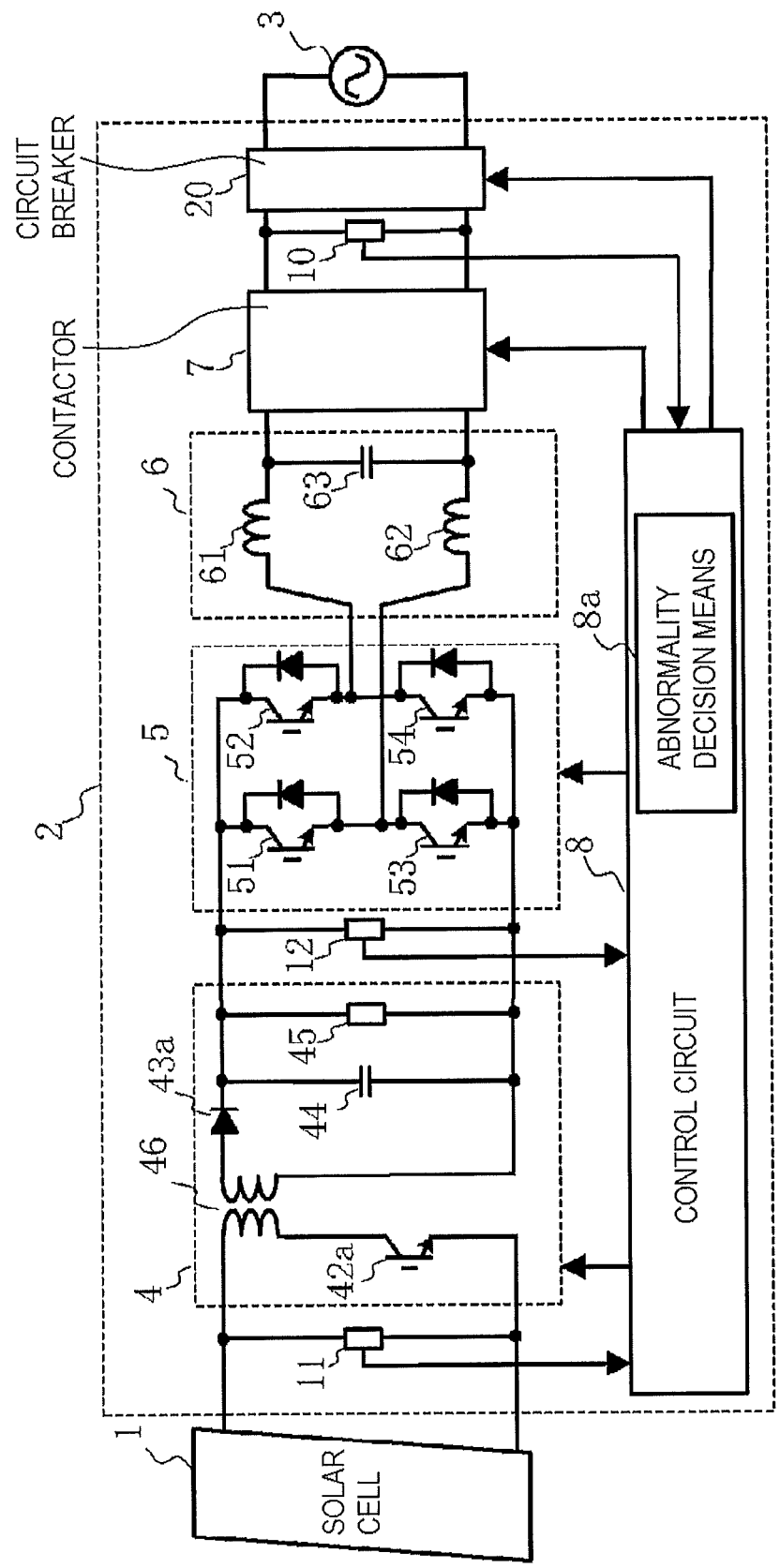
FIG. 4 is a block diagram showing a second example of a solar cell power generation system as an example of a grid connection system according to the invention.

FIG. 4 is a block diagram showing a second example of a solar cell power generation system as an example of a grid connection system according to the invention. In the example, the DC voltage conversion circuit 4 in FIG. 1 is formed with an insulated DC/DC converter circuit.

The insulated DC/DC converter circuit 4 in the example is formed of a transformer 46, a switching device 42*a* such as an IGBT, a diode 43*a*, a capacitor 44 and a resistor 45. Specifically, one end of the primary winding of the transformer 46 is connected to the positive electrode side of the solar cell 1 and the other end of the primary winding is connected to the collector terminal of the switching device 42*a*. The emitter terminal of the switching device 42*a* is connected to the negative electrode side of the solar cell 1. Moreover, one end of the secondary winding of the transformer 46 is connected to the anode side of the diode 43*a*, the cathode side of the diode 43*a* is connected to the positive side input terminal of the inverter circuit 5 in the next stage, and the other end of the secondary winding of the transformer 46 is connected to the negative side input terminal of the inverter circuit 5. Furthermore, between the cathode side of the diode 43*a* and the secondary winding of the transformer 46 connected to the negative side input terminal of the inverter circuit 5, the capacitor 44 is connected and, in parallel to the capacitor 44, the resistor 45 is connected.

The control circuit 8 carries out control so that the value of the output voltage of the DC/DC converter circuit 4 becomes a specified value. Specifically, the output voltage of the DC/DC converter circuit 4 is detected by a voltage detector 12, whose detection signal is inputted to the control circuit 8. The control circuit 8 carries out an arithmetic operation so that the value of the output voltage of the DC/DC converter circuit 4 becomes a specified value to determine the duty ratio for making the switching device 42*a* turned-on and -off. With thus determined duty ratio, the control circuit 8 makes the switching device 42*a* turned-on and -off to carry out control so that a rectangular wave voltage is applied to the primary winding of the transformer 46. In the secondary winding of the transformer 46, a voltage is generated according to the rectangular wave voltage applied to the primary winding. The rectangular wave voltage generated in the secondary winding of the transformer 46 charges the capacitor 44 through the diode 43*a*, by which the voltage across the capacitor 44 is controlled to be constant.

In the example, when the operation of the grid-connected inverter 2 is stopped, the capacitor 44 is discharged through the resistor 45, by which the voltage across the capacitor 44 is lowered down to 0V. Therefore, the threshold value of the voltage for deciding the presence or absence of an abnormality of the contactor 7 is set at the value of a voltage between 0V and the voltage obtained by carrying out full-wave rectification of the minimum voltage of the commercial power system 3. This, like in the case of the first example, enables the switch abnormality decision means 8*a* in the control circuit 8 to reliably make a decision of the presence or absence of an abnormality of the contactor 7.

Moreover, in the example, the DC voltage conversion circuit 4 is formed with an insulated DC/DC converter circuit with one semiconductor device. The DC voltage conversion circuit 4, however, even though it is formed with an insulated DC/DC converter circuit formed with a half bridge or a full-bridge, the same advantage can be obtained.

Figure 5:
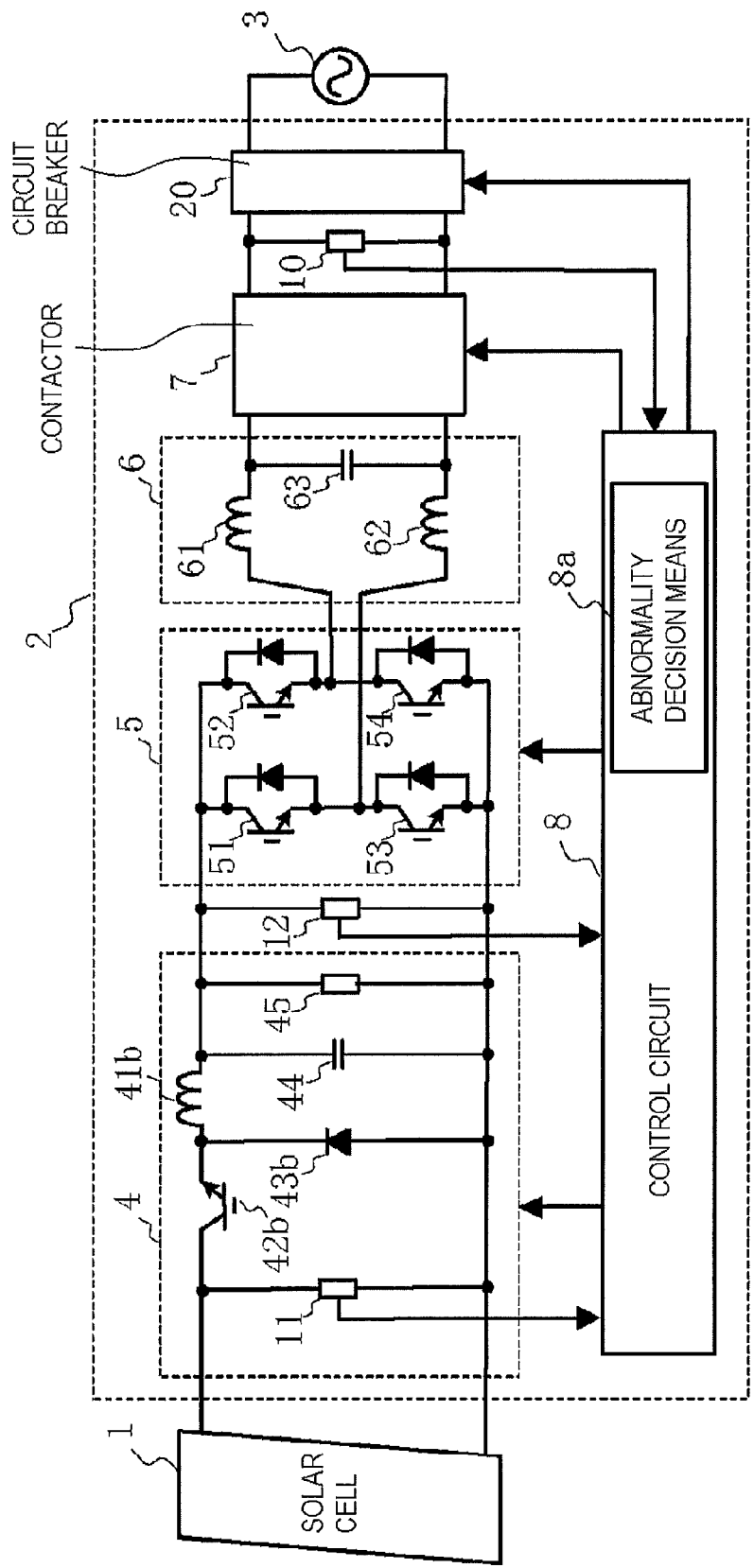
FIG. 5 is a block diagram showing a third example of a solar cell power generation system as an example of a grid connection system according to the invention.

FIG. 5 is a block diagram showing a third example of a solar cell power generation system as an example of a grid connection system according to the invention. In the example, the DC voltage conversion circuit 4 in FIG. 1 is formed with a step-down chopper circuit.

The step-down chopper circuit 4 in the example is formed of an inductor 41*b*, a switching device 42*b*, a diode 43*b*, a capacitor 44 and a resistor 45. Specifically, the positive electrode side of the solar cell 1 is connected to the collector terminal of the switching device 42*b* such as an IGBT and, the emitter terminal of the switching device 42*b* is connected to a series circuit of the inductor 41*b* and the capacitor 44. The other end of the capacitor 44 is connected to the negative electrode side of the solar cell 1. Further, the diode 43*b* is connected between the connection point, to which the switching device 42*b* and the inductor 41*b* are connected, and the negative electrode side of the solar cell 1. Moreover, the resistor 45 is connected across the capacitor 44. In addition, both ends of the capacitor 44 are connected to their respective input terminals of the inverter circuit 5 in the next stage.

The output voltage of the step-down chopper circuit 4 is detected by the voltage detector 12, whose detection signal is inputted to the control circuit 8. The control circuit 8 carries out an arithmetic operation so that the value of the voltage across the capacitor 44 becomes a specified value to determine the duty ratio for making the switching device 42*b* turned-on and -off. With thus determined duty ratio, the control circuit 8 makes the switching device 42*b* turned-on and -off to control the value of the voltage across the capacitor 44 to be the specified value.

In the example, when the operation of the grid-connected inverter 2 is stopped, the capacitor 44 is discharged through the resistor 45, by which the voltage across the capacitor 44 is lowered down to 0V. Therefore, the threshold value of the voltage for deciding the presence or absence of an abnormality of the contactor 7 is set at the value of a voltage between 0V and the voltage obtained by carrying out full-wave rectification of the minimum voltage of the commercial power system 3. This, like in the case of the first example, enables the switch abnormality decision means 8*a* in the control circuit 8 to reliably make a decision of the presence or absence of an abnormality of the contactor 7.

In the second example and the third example, the threshold value of the voltage for deciding the presence or absence of an abnormality of the contactor 7 can be determined on the basis of the specified minimum voltage of the commercial power system 3 or the voltage detected by the voltage detector 10.

Moreover, in the first to the third examples, when ripple components accompanying the full-wave rectification are included in the voltage across the capacitor 44, the upper limit of the threshold value is adequately determined with a voltage including the ripple component taken into consideration.

Furthermore, in the first example to the third example, the embodiment of the invention is explained with solar cell power generation systems taken as examples. The invention, however, is not limited to grid-connected inverters in solar cell power generation systems, but can be applied to grid-connected inverters in fuel cell power generation systems and other grid connection systems.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. A grid-connected inverter, comprising:
   a first electric power conversion circuit converting a first DC voltage to a second DC voltage;
   a second electric power conversion circuit converting the second DC voltage to an AC voltage;
   a contactor connecting the output side of the second electric power conversion circuit to a power system; and
   a control circuit controlling start and stop operations of the first and second electric power conversion circuits, and controlling opening and closing of the contactor,
   the control circuit including means for deciding whether a condition of the contactor is abnormal by
      detecting, after the control circuit controls the contactor to be open, whether a value of the second DC voltage is equal to or more than a specified threshold value, and
      if the value of the second DC voltage is detected to be equal to or more than the specified threshold value, deciding that the condition of the contactor is abnormal.

2. The grid-connected inverter according to claim 1, further comprising:
   a clamping means clamping the second DC voltage to the first DC voltage when the control circuit stops the first and second electric power conversion circuits,
   wherein the threshold value is a value not less than a value of the first DC voltage and not more than a value of a rectified voltage of the power system.

3. The grid-connected inverter according to claim 1, wherein the threshold value is a value based on at least one of a value of the first DC voltage and a value of a voltage of the power system.

4. The grid-connected inverter according to claim 1, further comprising:
   a capacitor connected to an output side of the first electric power conversion circuit; and
   a capacitor discharging means discharging the capacitor when the first and second electric power conversion circuits are stopped, wherein
   the threshold value is a voltage value not less than 0V and not more than a value of a rectified voltage of the power system.

5. The grid-connected inverter according to claim 4, wherein, when ripple components accompanying a full-wave rectification are included in a voltage across the capacitor, an upper limit of the threshold value is determined based on a voltage that includes the ripple components.

6. The grid-connected inverter according to claim 1, further comprising a circuit breaker disposed between the contactor and the power system, wherein the control circuit opens the circuit breaker when the abnormality decision means decides that the contactor is in an abnormal condition.

7. The grid-connected inverter according to claim 1, wherein the control circuit opens the contactor to disconnect the grid-connected inverter from the power system when the abnormality decision means decides that the contactor is in an abnormal condition.

8. The grid-connected inverter according to claim 1, wherein the abnormality decision means calculates the threshold value by multiplying a value of the first DC voltage by a first coefficient, multiplying a value of a rectified voltage of the power system by a second coefficient, and adding together the multiplied value of the first DC voltage and the multiplied value of the rectified voltage.

9. The grid-connected inverter according to claim 1, further comprising:
   a transformer having a primary winding and a secondary winding, each having opposite first and second ends;
   a switching device having a control electrode, a high-potential-side control electrode and a low-potential-side control electrode, the high-potential-side control electrode being connected to the first end of the primary winding; and
   a diode connected at an anode side thereof to the first end of the secondary winding, wherein
      the first DC voltage is applied between the second end of the primary winding and the low-potential-side control electrode and
      the second DC voltage is outputted between a cathode side of the diode and the second end of the secondary winding.

10. The grid-connected inverter according to claim 1, further comprising:
   a switching device having a control electrode, a high-potential-side control electrode and a low-potential-side control electrode;
   an inductor having first and second ends, connected at the first end to the low-potential-side control electrode; and
   a diode connected at a cathode side thereof to the low-potential-side control electrode, wherein
      the first DC voltage is applied between an anode side of the diode and the high-potential-side control electrode and
      the second DC voltage is outputted between the second end of the inductor and the anode side of the diode.

11. The grid-connected inverter according to claim 1, wherein the control circuit stops the first and second electric power conversion circuits when the abnormality decision means decides that the contactor is in an abnormal condition.

12. The grid-connected inverter according to claim 1, wherein an abnormal condition of the detector is contact cohesion.

* * * * *